(12) United States Patent
Becherer

(10) Patent No.: US 9,905,269 B2
(45) Date of Patent: Feb. 27, 2018

(54) MULTIMEDIA CONTENT DURATION MANIPULATION

(71) Applicant: Adobe Systems Incorporated, San Jose, CA (US)

(72) Inventor: Nico Becherer, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 696 days.

(21) Appl. No.: 14/534,543

(22) Filed: Nov. 6, 2014

(65) Prior Publication Data
US 2016/0133296 A1    May 12, 2016

(51) Int. Cl.
| G11B 27/00 | (2006.01) |
| H04N 5/93 | (2006.01) |
| G11B 27/038 | (2006.01) |
| G11B 27/34 | (2006.01) |
| G11B 27/036 | (2006.01) |

(52) U.S. Cl.
CPC .......... *G11B 27/038* (2013.01); *G11B 27/036* (2013.01); *G11B 27/34* (2013.01)

(58) Field of Classification Search
CPC ............................. G11B 27/038; G11B 27/036
See application file for complete search history.

(56) References Cited

U.S. PATENT DOCUMENTS

| 5,995,153 A | 11/1999 | Moeller et al. |
| 6,424,677 B1 * | 7/2002 | Moeller ............... G11B 27/034 |
| | | 348/E7.003 |
| 7,092,774 B1 | 8/2006 | Gifford et al. |
| 8,724,968 B2 | 5/2014 | Gifford et al. |
| 2013/0077699 A1 | 3/2013 | Gifford et al. |
| 2013/0279884 A1 | 10/2013 | Gifford |
| 2014/0250482 A1 | 9/2014 | Gifford |

OTHER PUBLICATIONS

Viola, et al., "Robust Real-time Object Detection", Cambridge Research Laboratory Technical Report Series, CRL 2001/01 (Feb. 2001).
"Workflow Comparison: Time Tailor versus Non-Linear Editing Systems", Prime Image, retreived from <http://www.primeimage.com/pdfs/Prime%20Image%20Time%20Tailor%20vs%20Non%20Linear%20Editing%20Systems.pdf> on Oct. 15, 2014.

* cited by examiner

*Primary Examiner* — Hung Dang
*Assistant Examiner* — Girumsew Wendmagegn
(74) *Attorney, Agent, or Firm* — Finch & Maloney PLLC

(57) ABSTRACT

Average pixel luminosity is calculated for each frame comprising a content item. For each pair of adjacent frames, an IFD is calculated. The IFD represents the difference between a baseline pixel luminosity associated with each of the two frames. An initial set of cut frames is selected based on IFD values that are less than a minimum value $IFD_{min}$, or that are greater than a maximum value $IFD_{max}$. The positions of these initial cut frames are optimized using a numerical optimization technique that favors removal of frames corresponding to IFD extrema, but that also attempts to maintain a minimum time gap between cut frames. Selecting frames for removal is approached as a constraint minimization problem. Once an optimized set of cut frames is established, audio is cut and crossfaded in a temporal window surrounding cut frame positions.

19 Claims, 6 Drawing Sheets

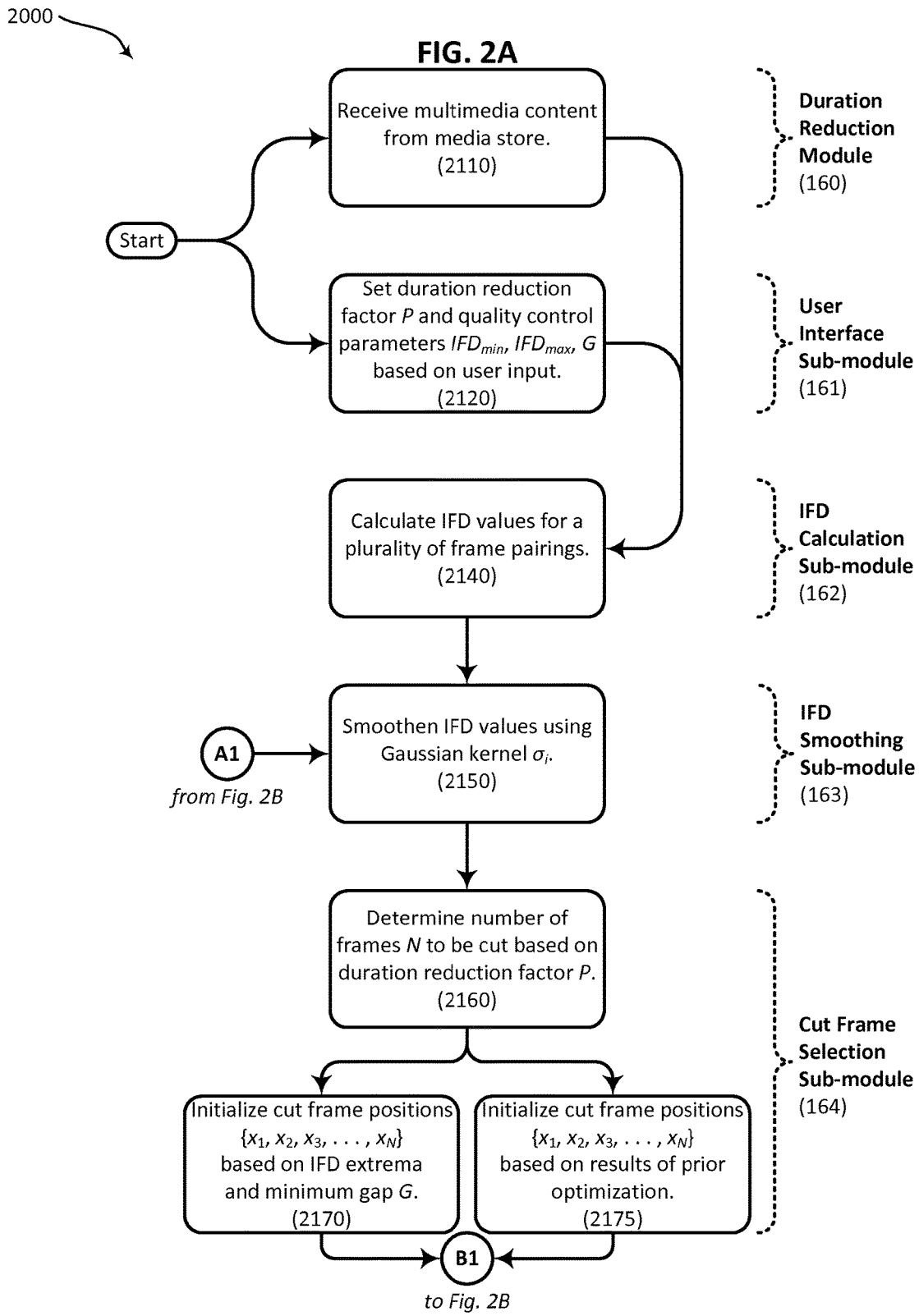

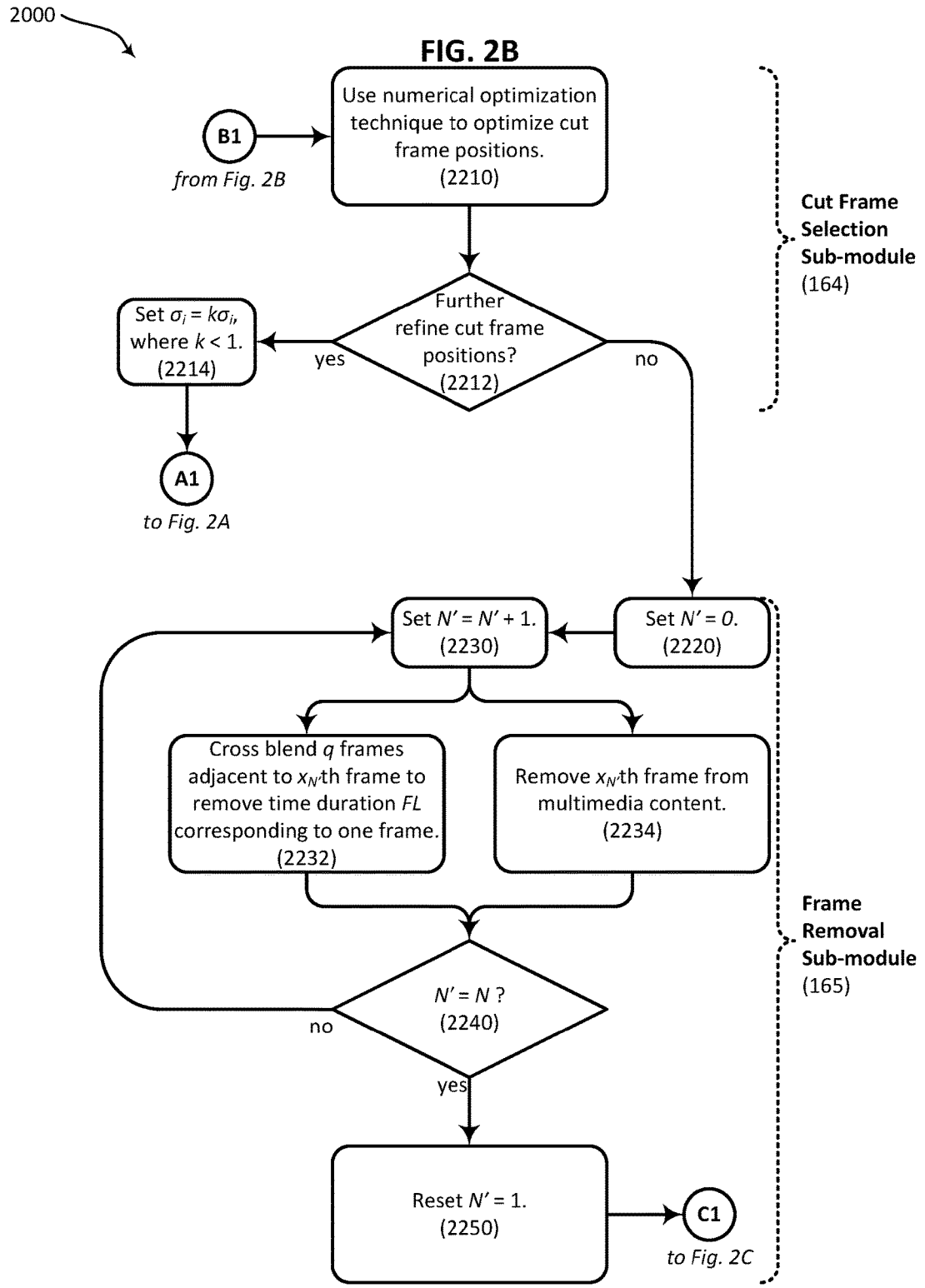

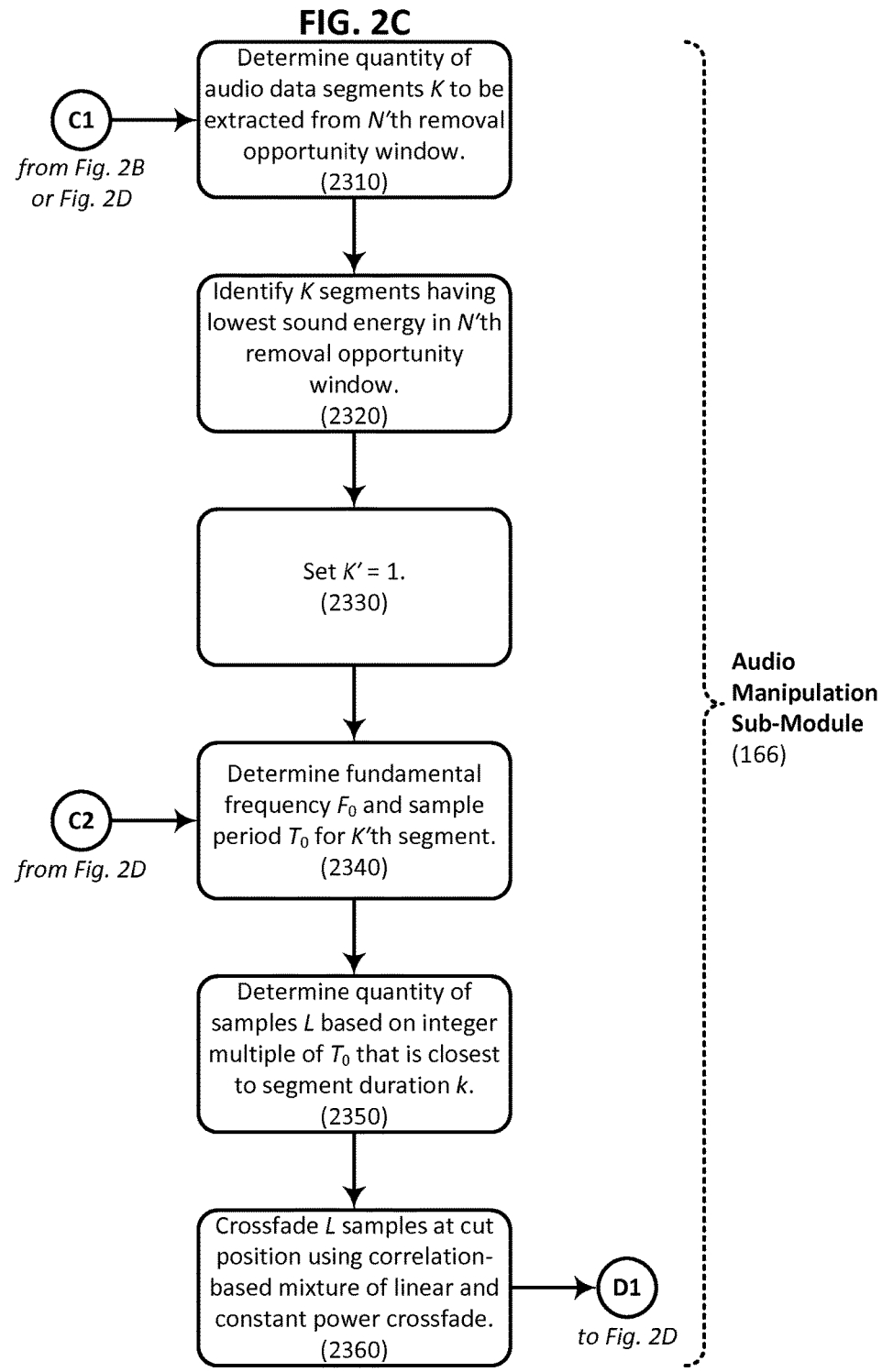

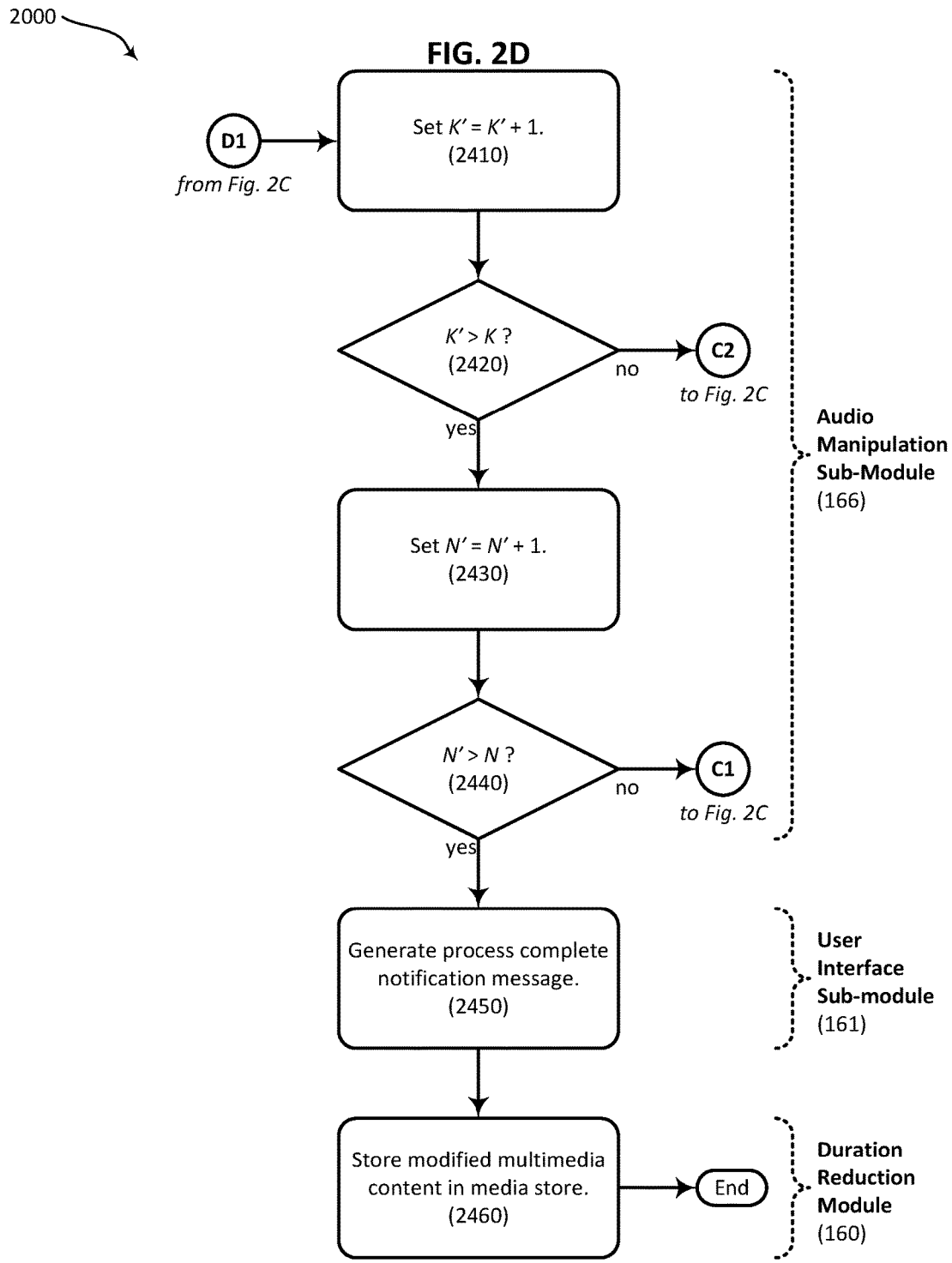

Unmodified Multimedia Content Item
(3000)

Reduced Duration Multimedia Content Item
(3200)

Inserted Content (3100)

MULTIMEDIA CONTENT DURATION MANIPULATION

FIELD OF THE DISCLOSURE

This application relates generally to manipulation of multimedia content items, and more specifically to methods for manipulating the duration of multimedia content items in an analytical and controllable manner that is both visually and audibly subtle.

BACKGROUND

The duration of multimedia content—such as television programming—is often manipulated to fit within a scheduled timeslot. For example, the television broadcast schedule in the United Kingdom includes hour-long timeslots that are configured to accommodate between 45 minutes and 48 minutes of programming. On the other hand, the television broadcast schedule in the United States includes hour-long timeslots that are configured to accommodate between 39 minutes and 42 minutes of programming. As a result, if a British television program is to be adapted for viewing in the United States its duration should be reduced slightly. Even where programming is not being adapted for another market, many applications still call for a slight increase or decrease in the duration of such programming. For instance, television programs having a duration that does not necessarily conform to the standardized timeslots that comprise a broadcast schedule are apt candidates for duration manipulation. Examples of such programming include sporting events, live performances, and breaking news coverage. Outside the field of television broadcasting, it is still often desired to manipulate the duration of distributed multimedia content, for instance in the context of online streaming services and portable media distribution schemes such as digital video disc sales or rentals. Given the wide range of applications which call for manipulating multimedia content duration, a number of techniques have been developed to perform such manipulations. For instance, Time Tailor (Prime Image, Inc., Chalifont, Pa.) is one example of an existing tool that can be used to reduce the duration of a television program to create additional commercial time in a broadcast schedule.

BRIEF DESCRIPTION OF THE DRAWINGS

FIGS. 2A through 2D comprise a flowchart illustrating an example technique for manipulating the duration of multimedia content items in an analytical and controllable manner that is both visually and audibly subtle.

DETAILED DESCRIPTION

Figure 1:
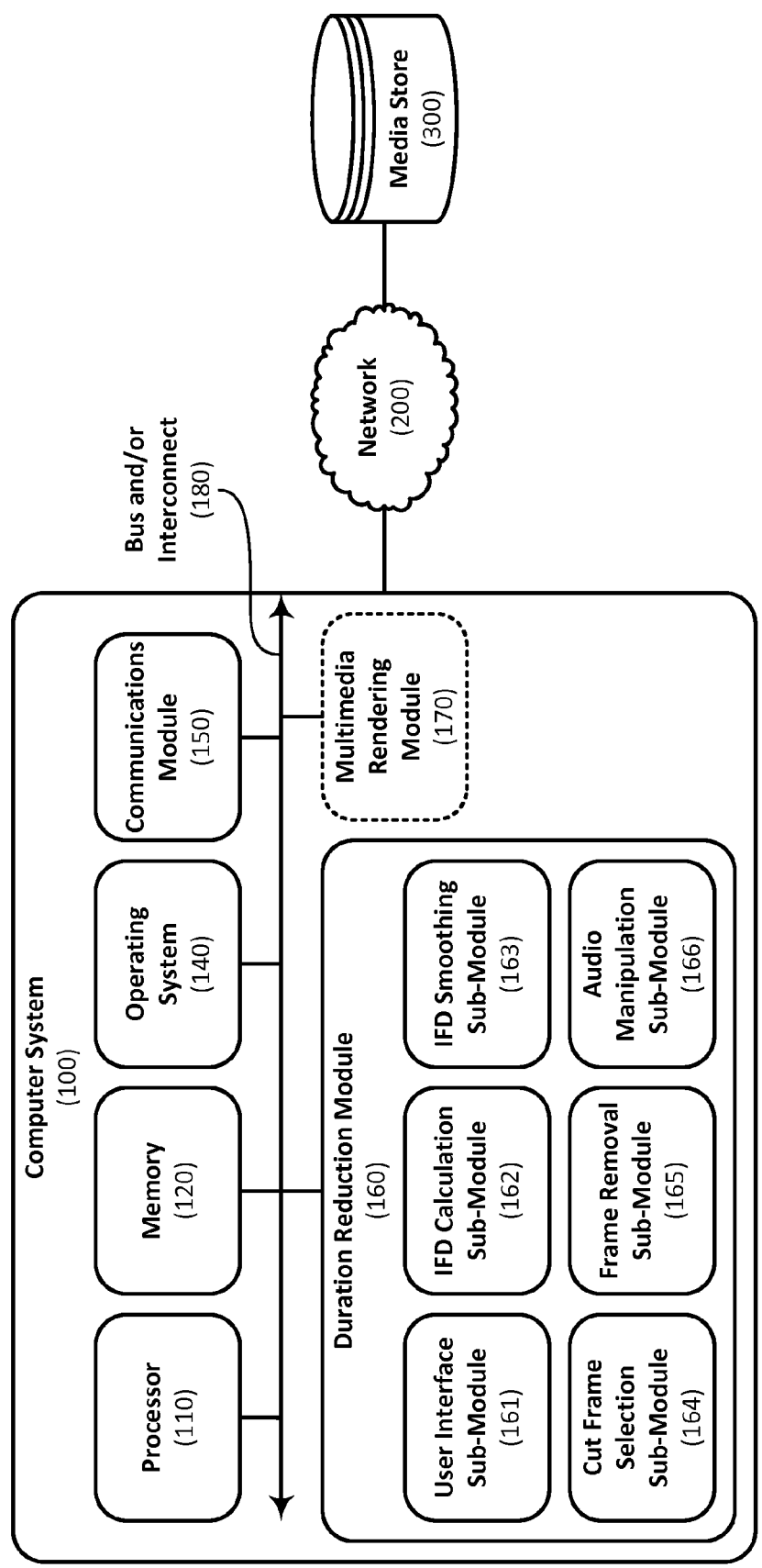
FIG. 1 is a block diagram schematically illustrating selected components of an example computer system that can be used to manipulate the duration of multimedia content items in an analytical and controllable manner that is both visually and audibly subtle.

A multimedia content item can be understood as comprising a collection of synchronized audio and video segments that are arranged for sequential playback. The duration of the content item can therefore be manipulated by adding or removing such segments, or by adjusting the speed at which the segments are played. A significant challenge lies in implementing these manipulations in a visually and audibly subtle manner such that they are not easily noticed when a consumer views the manipulated content item. As a result, existing solutions for manipulating the duration of multimedia content tend to suffer from a number of shortcomings. For example, solutions that operate by manipulating the playback speed or frame rate tend to result in undesirable visible and audible artifacts. Solutions that rely on segment addition or removal generally (a) rely on manual input to identify appropriate editing points, which tends to be time consuming and expensive, or (b) rely on a window-based analysis of smaller content blocks that comprise the multimedia asset, which tends to produce suboptimal results. Moreover, existing automated algorithms for identifying segments to be removed tend not to efficiently identify frames that can be removed subtly. These shortcomings represent substantial limitations that make it difficult for broadcasters and program managers to "micro-schedule" their content—that is, to subtly manipulate multimedia content duration to conform to predetermined scheduled timeslots.

Techniques are disclosed herein for manipulating the duration of a multimedia content item in a way that addresses certain of these shortcomings. In one embodiment average pixel luminosity is calculated for each frame comprising a multimedia content item. For each pair of adjacent frames, an inter frame distance (IFD) is calculated, wherein the IFD represents the difference between a baseline pixel luminosity associated with each of the two frames. An initial set of frames to be removed from the content item (also referred to herein as "cut frames") is selected based on IFD values that are less than a pre-established minimum value $IFD_{min}$, or that are greater than a pre-established maximum value $IFD_{max}$. The positions of these initial cut frames are optimized using a numerical optimization technique that favors removal of frames corresponding to extreme IFD values, but that also attempts to maintain a minimum time gap G between cut frames. Thus selecting frames for removal can be understood and approached as a constraint minimization problem. Once an optimized set of cut frames is established, audio is cut and crossfaded in a temporal window surrounding each cut frame. Numerous configurations and modifications will be apparent in light of this disclosure, including modifications that enable the duration of the content item to be increased instead of decreased.

A number of advantages are associated with certain of the disclosed embodiments. For example, certain of the techniques disclosed herein reduce the duration of a multimedia content item without introducing easily noticeable visible or audible artifacts into the modified content item. The appearance of artifacts depends on a number of factors ranging from the type of programming, the compression techniques used to encode the content, and the content consumer's visual and aural acuity. However, in general, duration reductions of up to 10% have been observed to be unnoticeable to most content consumers, while even higher reductions have been observed to be barely or only occasionally noticeable. Because IFD extrema are identified and located based on an analysis of an entire content item, such analysis produces superior results as compared to a window-based approach that analyzes and processes the content item on a segment-by-segment basis. In particular, existing solutions which use a window-based approach tend to "force" frame cutting even in regions where such cuts may be more easily noticed. A wide range of different multimedia content can be processed using the techniques disclosed herein, including both interlaced and non-interlaced content. Certain embodiments also advantageously avoid human intervention and/or input by automating the duration manipulation process, thereby reducing costs and processing times. For example, in one implementation, a user simply identifies a multimedia content item to be processed and a target duration modification; other quality control parameters and settings can be applied based on predefined default values. This enables content to be processed efficiently and quickly: in one example embodiment one hour of high definition multimedia content is processed in less than five minutes.

As used herein, the term "multimedia content" refers, in addition to its ordinary meaning, to audio, visual, or audiovisual information intended for consumption by a user, organization, or other human- or computer-controlled entity. In general, multimedia content can be understood as including audible recordings played via speakers or headphones, visual presentations that include one or more visual assets which may or may not change with the progression of time, and combinations of both audible and visual assets. Specific examples of multimedia content include television programs, movies, animated sequences, and other audiovisual assets. In applications where multimedia content includes both audio and video components, such components can be separated and subjected to different processing techniques. Multimedia content can be stored in a compressed digital format and may be created and manipulated using any suitable editing application. For example, multimedia content can be stored in any suitable file format defined by the Moving Picture Experts Group (MPEG), including MPEG-4, can be stored as a sequence of frames defined in a color space such as red-green-blue (RGB) or luma-chrominance (YUV), or can be stored in any other suitable compressed or uncompressed file format, including file formats generated in real-time by animation engines, compositing engines, or other video generation applications. Multimedia content may also include information that is not specifically intended for display, and thus also encompasses items such as embedded executable instructions, scripts, hyperlinks, metadata, encoding information, audio tracks, and formatting information. The term "multimedia content item" refers to a collection of multimedia content that is organized into a distinct unit, such as a file, which can be subjected to various processing operations. Thus while digital music or video may be referred to as multimedia content generally, a song or television episode may be referred to as a multimedia content item. Multimedia content items may also be referred to as "multimedia assets".

As used herein, the term "luminosity" refers, in addition to its ordinary meaning, to a measure of where a color falls on a spectrum between black and white. Luminosity can therefore be thought of as a measure of how close a given color is to black or white. Luminosity is typically expressed in terms of a percentage, where a luminosity of 0% corresponds to black and a luminosity of 100% corresponds to white. A color of a given hue and saturation having a luminosity of 50% will appear as close as possible to the pure color of that hue and saturation, as compared to colors having a higher (faded) or lower (darkened) luminosity. Thus luminosity is a unique parameter as compared to brightness and saturation in that the midpoint of the luminosity scale corresponds to a pure hue. Luminosity is also sometimes referred to as "lightness".

System Architecture

FIG. 1 is a block diagram schematically illustrating selected components of an example computer system 100 that can be used to manipulate the duration of multimedia content items in an analytical and controllable manner that is both visually and audibly subtle. Computer system 100 may comprise, for example, one or more devices selected from a desktop computer, a laptop computer, a workstation, a tablet computer, a smartphone, a handheld computer, a set-top box, an enterprise class server, or any other such computing device. A combination of different devices may be used in certain embodiments. In the illustrated embodiment, computer system 100 includes, among other things, a processor 110, a memory 120, an operating system 140, a communications module 150, a duration reduction module 160, and an optional multimedia rendering module 170. In alternative embodiments a duration increase module is provided in addition to, or instead of, duration reduction module 160. As can be further seen, a bus and/or interconnect 180 is also provided to allow for inter- and intra-device communications using, for example, communications module 150. Computer system 100 is optionally coupled to a network 200 to allow for communications with other computing devices or resources, such as a networked media store 300. Other componentry and functionality not reflected in the schematic block diagram of FIG. 1 will be apparent in light of this disclosure, and it will be appreciated that other embodiments are not limited to any particular hardware configuration.

Processor 110 can be any suitable processor, and may include one or more coprocessors or controllers, such as an audio processor or a graphics processing unit, to assist in control and processing operations associated with computer system 100. Memory 120 can be implemented using any suitable type of digital storage, such as one or more of a disc drive, a universal serial bus (USB) drive, flash memory, and/or random access memory (RAM). Operating system 140 may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with computer system 100, and therefore may also be implemented using any suitable existing or subsequently-developed platform. Communications module 150 can be any appropriate network chip or chipset which allows for wired and/or wireless connection to other components of computer system 100 and/or to network 200, thereby enabling computer system 100 to communicate with other local and/or remote computer systems, servers, and/or resources.

Duration reduction module 160 is configured to subtly reduce the duration of a multimedia content item by cutting video frames from the content and crossfading audio that corresponds to the cut video frames. Duration reduction module 160 can be implemented with a variety of suitable software and/or hardware that is coupled to or that otherwise forms part of computer system 100. For example, in terms of software, in certain embodiments duration reduction module 160 is used in conjunction with a video editing application, thereby allowing users to manipulate the duration of video content. In other embodiments duration reduction module 160 is used in conjunction with a media player application or other software component capable of rendering multimedia content, such as multimedia rendering module 170. For instance in one implementation a media player is configured to automatically reduce the duration of a content item and to insert an advertisement into the content item. In terms of hardware, duration reduction module 160 can be implemented or otherwise used in conjunction with input/output devices such as a display, a video camera, a textual input device such as a keyboard, and/or a pointer-based input device such as a mouse. Other input/output devices that may be used in other embodiments include a touchscreen, a touchpad, a speaker, and/or a microphone. Still other input/output devices can be used in other embodiments.

In certain embodiments duration reduction module 160 is installed local to computer system 100, as illustrated in FIG. 1. Alternatively, in embodiments where computer system 100 is implemented as a client in a client-server architecture, at least some functionality associated with duration reduction module 160 is downloaded from a server using an applet, such as a JavaScript applet, or other downloadable module. Such a remotely accessible module or sub-module can be provided in real-time in response to a request from computer system 100. For example, a user of a tablet computer may invoke functionality associated with duration reduction module 160 upon accessing multimedia content which is to be viewed or otherwise processed, and which may be retrieved from media store 300. In such embodiments the server can be local to network 200 or remotely coupled to network 200 by one or more other networks and/or communication channels. In some cases access to resources on a given network or computing system may require credentials such as usernames, passwords, and/or compliance with any other suitable security mechanism. In any such standalone or networked computing scenarios, duration reduction module 160 may be implemented with any suitable technology that allows a user to perform frame-by-frame analysis of a multimedia content item.

Still referring to FIG. 1, in certain embodiments duration reduction module 160 includes a user interface sub-module 161, an IFD calculation sub-module 162, an IFD smoothing sub-module 163, a cut frame selection sub-module 164, a frame removal sub-module 165, and an audio manipulation sub-module 166. In certain embodiments user interface sub-module 161 is used, for example, to receive user input that identifies a multimedia asset to be manipulated and defines the parameters of the manipulation including, for example, quality control parameters. User interface sub-module 161 also optionally provides information such as a maximum duration reduction that is available for a given multimedia content item, or a likelihood that a targeted duration reduction will produce visible and/or audible artifacts. Regardless of the specific functionality provided, in such embodiments user interface sub-module 161 can be configured to work in conjunction with suitable input/output hardware such as touch sensitive display.

In an example embodiment IFD calculation sub-module 162 calculates an IFD for each pair of adjacent frames that comprise the processed multimedia content item. The IFD represents the difference between a baseline pixel luminosity for each of the two frames. Because the IFD values are calculated numerically and are often subject to large variations, in certain embodiments IFD smoothing sub-module 163 performs one or more iterative smoothing operations on the IFD values. In particular, once an optimized set of cut frame positions is established as will be described in turn, the IFD values can be smoothed and the optimization can be performed again using the optimized set of cut frame positions as seed points. It has been found that performing one or more iterations of (a) smoothing the IFD values, (b) finding a first optimized set of cut frame positions, (c) smoothing the IFD values again using a Gaussian kernel of decreasing sigma, and (d) finding a subsequent optimized set of cut frame positions reduces the likelihood that visible and/or audible artifacts will be present in a reduced-duration multimedia content item.

Cut frame selection sub-module 164 is configured to identify a plurality of video frames that are suitable to be removed from a multimedia content item. The number of frames which are to be removed depends on the extent to which the duration of the content item is to be reduced, with large quantities of cut frames corresponding to greater duration reductions. In one embodiment, an initial set of cut frames is selected based on IFD values that are less than the pre-established minimum value $IFD_{min}$, or that are greater than the pre-established maximum value $IFD_{max}$. The threshold parameters $IFD_{min}$ and $IFD_{max}$ can be understood as quality control parameters that affect the perceived subtlety of the duration reduction, wherein a lower $IFD_{min}$ value and/or a higher $IFD_{max}$ value correspond to more restrictive frame cutting conditions, and therefore a lower likelihood that a viewer will notice the cut frame. Once the initial set of cut frames is identified, cut frame selection sub-module 165 is further configured to optimize the positions of these cut frames using a numerical optimization technique. In particular, identifying a preferred cut frame position can be understood as a minimization process that favors removal of frames corresponding to extreme IFD values, but that also attempts to maintain the minimum time gap G between cut frames. The minimum time gap G is yet another quality control parameter that prevents several frames from being removed in a short time window, which would make it difficult to synchronize the corresponding audio without producing audible artifacts. Once the cut frame positions are optimized or otherwise not subjected to further processing, frame removal sub-module 165 can be configured to remove frames from the multimedia content item at the identified cut frame positions. This can be accomplished by simply removing the identified cut frame, or by cross-blending a plurality of frames adjacent to the identified cut frame, wherein the cross-blending removes a time duration that corresponds to the duration of a single frame.

Simply removing the video frames identified and positioned by cut frame selection sub-module 164 will result in a multimedia content item having an audio track that is longer than its video track. To address this, audio manipulation sub-module 166 is configured to cut and crossfade audio in a narrow window surrounding each cut frame. In particular, a narrow window surrounding each cut frame is divided into a plurality of smaller audio segments, each of which is associated with an average sound energy value that measures the intensity of sound within that segment. Audio cutting and crossfading is performed on the segments with the lowest average sound energy, wherein the audio crossfading is based on the fundamental frequency and sample period of the segment. This allows the duration of the audio track to be reduced such that it matches the modified video track. Additional details regarding the operation of the modules and sub-modules disclosed herein will be described in turn.

As described herein, in an alternative embodiment a duration increase module is provided in addition to, or instead of, duration reduction module 160. In one such alternative embodiment duration increase module includes one or more sub-modules capable of identifying positions where it would be appropriate to insert a duplicate frame into a multimedia content item for the purpose of increasing the duration of the content item. Examples of sub-modules which are included in the duration increase module include an IFD calculation sub-module and an IFD smoothing sub-module. Such sub-modules operate similarly or identically to those used in conjunction with duration reduction module 160, and indeed, shared sub-modules can be implemented in certain embodiments. The duration increase module also includes an inserted frame positioning sub-module that is configured to optimize a set of positions suitable for inserting duplicative frames. In such case, inserted frame positioning sub-module operates on the same principle as cut frame selection sub-module 164, wherein an initial set of frame positions is optimized using a numerical optimization technique that favors frames corresponding to extreme IFD values, but that also attempts to maintain a minimum time gap G between frame insertions. In some implementations a duplicative frame is inserted, while in other implementations a cross-blended frame is inserted. Duration increase module also includes an audio manipulation sub-module that operates similarly or identically to the corresponding sub-module in duration reduction module 160, thereby maintaining a common duration between the audio and video tracks. Thus it will be appreciated that alternative embodiments can be configured to manipulate a multimedia content item to have a shorter or longer duration.

The embodiments disclosed herein can be implemented in various forms of hardware, software, firmware, or special purpose processors. For example, in one embodiment a non-transitory computer readable medium has instructions encoded thereon that, when executed by one or more processors, cause one or more of the methods for manipulating the duration of multimedia content items disclosed herein to be implemented. The instructions can be encoded using one or more suitable programming languages, such as C, C++, object-oriented C, JavaScript, Visual Basic .NET, BASIC, or alternatively, using custom or proprietary instruction sets. Such instructions can be provided in the form of one or more computer software applications or applets that are tangibly embodied on a memory device, and that can be executed by a computer having any suitable architecture. In one embodiment the system can be hosted on a given website and implemented using JavaScript or another suitable browser-based technology.

The functionalities disclosed herein can optionally be incorporated into a variety of different software applications, including video editing applications, video analysis applications, digital content scheduling applications, or other content generation, modification, and/or management applications. Moreover, the functionalities disclosed herein can additionally or alternatively leverage services provided by separate software modules, such as content management services or user authentication services. The computer software applications disclosed herein may include a number of different modules, sub-modules, or other components of distinct functionality, and can provide information to, or receive information from, still other components and/or services. These modules can be used, for example, to communicate with input and/or output devices such as a display screen, a touch sensitive surface, a printer, and/or any other suitable input/output device. Other components and functionality not reflected in the illustrations will be apparent in light of this disclosure, and it will be appreciated that the claimed invention is not intended to be limited to any particular hardware or software configuration. Thus in other embodiments duration reduction module 160 may comprise additional, fewer, or alternative subcomponents as compared to those included in the example embodiment illustrated in FIG. 1. For example, in one alternative embodiment duration reduction module 160 includes a sub-module configured for media playback, such as might otherwise be provided by multimedia rendering module 170.

The aforementioned non-transitory computer readable medium may be any suitable medium for storing digital information, such as a hard drive, a server, a flash memory, and/or random access memory. In alternative embodiments, the computer and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used in this regard, and that the various embodiments disclosed herein are not intended to be limited to any particular system architecture.

Methodology

FIGS. 2A through 2D comprise a flowchart illustrating an example method 2000 for manipulating the duration of a multimedia content item. As can be seen, duration manipulation method 2000 includes a number of phases and sub-processes, the sequence of which may vary from one embodiment to another. However, when considered in the aggregate, these phases and sub-processes form a complete multimedia content duration manipulation method that is responsive to user commands in accordance with certain of the embodiments disclosed herein. This method can be implemented, for example, using the system architecture illustrated in FIG. 1. However other system architectures can be used in other embodiments, as will be apparent in light of this disclosure. To this end, the correlation of the various functionalities shown in FIGS. 2A through 2D to the specific components illustrated in FIG. 1 is not intended to imply any structural and/or use limitations. Rather, other embodiments may include varying degrees of integration wherein multiple functionalities are performed by one system or by separate systems. For instance, in an alternative embodiment a single module can be used to manipulate the duration of a multimedia content item and render the content item. Thus other embodiments may have fewer or more modules and sub-modules depending on the granularity of implementation. Numerous variations and alternative configurations will be apparent in light of this disclosure.

Still referring to FIGS. 2A through 2D, in one embodiment method 2000 commences with duration reduction module 160 receiving a multimedia content item from networked media store 300. See reference numeral 2110 in FIG. 2A. The multimedia content item may alternatively be received from a different source, such as from a storage resource that is local to computer system 100 (for example, a hard disc drive or a portable storage device), or from a different type of networked storage resource (for example, an electronic mail server or a peer-to-peer network). Method 2000 may additionally or alternatively commence with user interface sub-module 161 setting a duration reduction factor and/or quality control parameters based on user input or some other source. See reference numeral 2120 in FIG. 2A. For example, in some cases the multimedia content item is received before the duration reduction factor and/or quality control parameters are set, in other cases the multimedia content item is received after the duration reduction factor and/or quality control parameters are set, and in still other embodiments such receipt occurs simultaneously.

A duration reduction factor P defines the extent to which the duration of a content item is to be reduced. In one implementation, duration reduction factor P is defined as the ratio of the target duration to the original duration, such that a factor P=1.0 corresponds to no duration reduction. For example, if a content item having a duration of 300 seconds is to be reduced by 30 seconds to allow for insertion of a commercial advertisement, then the target duration reduction factor P=270÷300=0.90. The duration reduction factor P can be provided on a case-by-case basis by a user interacting with user interface sub-module 161, although in certain embodiments a default duration reduction factor can be applied in the absence of user input. In alternative embodiments a user can specify a target duration that the content item should have and the duration reduction factor P is calculated based on the ratio of the user-specified target duration to the known original duration.

Quality control parameters $IFD_{min}$ and $IFD_{max}$ define lower and upper thresholds, respectively, for identifying video frames which are suitable for removal from a multimedia content item. For example, a frame associated with an IFD value that is less than $IFD_{min}$ will appear vary similar to its neighbors. Such a frame might be considered to be a still frame or a nearly still frame, and therefore could probably be removed from the content item without significantly affecting how the content item appears during playback. Such a frame would therefore be suitable for removal. Likewise, a frame associated with an IFD value that is greater than $IFD_{max}$ will likely occur during a fast action scene, or immediately adjacent to a cut. Such a frame could also probably be removed from the content item without significantly affecting how the content item appears during playback since it would be hidden within the fast action scene. In general, video frames associated with IFD values less than $IFD_{min}$ and greater than $IFD_{max}$ are frames which are unlikely to significantly affect how the content item appears during playback.

The parameters $IFD_{min}$ and $IFD_{max}$ can therefore be understood as quality control parameters. In particular, setting a higher $IFD_{min}$ threshold will increase the number of frames identified as suitable candidates for removal, and will therefore increase the likelihood that visible artifacts are introduced into the content item as a result of the duration manipulation. Likewise, setting a lower $IFD_{max}$ threshold will also increase the number of frames identified as suitable candidates for removal, and will therefore also increase the likelihood that visible artifacts are introduced into the content item as a result of the duration manipulation. In certain embodiments user interface sub-module 161 can be configured to receive specific user-defined values for $IFD_{min}$ and $IFD_{max}$, while in other embodiments user interface sub-module 161 can be configured to simply establish values for $IFD_{min}$ and $IFD_{max}$ based on a user's qualitative selection of higher quality or lower quality. This qualitative selection can be provided, for example, via a user interface element such as a slider extending from low to high quality or a radio button that can be toggled between low, medium, or high quality. In still other embodiments user interface sub-module 161 is configured to establish values for $IFD_{min}$ and $IFD_{max}$ based on predefined default values which may or may not be user adjustable.

A minimum gap duration G defines a preferred minimum duration between frames identified as being suitable for removal. Removing multiple frames within a short time period increases the likelihood that visible and/or audible artifacts, and especially audible artifacts, will be apparent as a result of the removal. Thus the minimum gap duration G can be understood as yet another quality control parameter. Setting a lower minimum gap duration G will increase the number of frames identified as suitable candidates for removal, and will therefore increase the likelihood that visible and/or audible artifacts are introduced into the content item as a result of the duration manipulation. For example, if several video frames are removed in a relatively short window, the corresponding audio will need to be adjusted within that same relatively short window. This can result in audible artifacts, and in particular, in the perception that the audio portion of the content item changes speed suddenly. Such changes are more obvious for content types such as rhythmic music, and are less obvious for other content types such as spoken dialog. As a result, in some implementations different minimum gap durations can be defined for different portions of a multimedia content item depending on the multimedia content itself.

In certain embodiments user interface sub-module 161 is configured to receive specific user-defined values for minimum gap duration G, while in other embodiments user interface sub-module 161 is configured to simply establish a value for minimum gap duration G based on a qualitative selection of higher quality or lower quality. This qualitative selection can be provided, for example, via a user interface element such as a slider extending from low to high quality or a radio button that can be toggled between low, medium, or high quality. In still other embodiments user interface sub-module 161 is configured to establish a value for minimum gap duration G based on a predefined default value which may or may not be user adjustable. In one embodiment minimum gap duration G is set to a value between about 0.10 seconds and about 1.00 seconds. In another embodiment minimum gap duration G is set to a value between about 0.20 seconds and about 0.60 seconds. In yet another embodiment minimum gap duration G is set to a value between about 0.25 seconds and about 0.50 seconds. In yet another embodiment minimum gap duration G is set to a value of about 0.35 seconds.

Referring again to the example embodiment illustrated in FIGS. 2A through 2D, once duration reduction module 160 has received the multimedia content item, IFD calculation sub-module 162 is configured to calculate IFD values for each of the adjacent frame pairings in the content item. See reference numeral 2140 in FIG. 2A. In one implementation IFD values are calculated by first generating a luminosity differential image that is defined by the difference between luminosities derived from the two adjacent frames. That is, the luminosity differential image is defined by $abs[lum(F_1)-lum(F_2)]$, where $F_1$ and $F_2$ are adjacent frames, and $lum(F_n)$ is a luminosity derived from frame $F_n$. The luminosity differential image can be used to compute an average luminosity differential for a large quantity of pixel subsets, such as rectangular pixel subsets, over an entire frame. The average luminosity differential for the plurality of pixel subsets can be calculated using an integral image. More specifically, an integral image can be computed by taking the luminosity differential image as input and computing an image such that the value at any pixel (x, y) represents the sum of a subset of pixels above and to the left of pixel (x, y). For example, in one embodiment each rectangular pixel subset has a height and width that is approximately one-quarter of the height and width of the original image, respectively. Amongst the large quantity of average luminosity differentials that are computed, the maximum luminosity differential is taken as the IFD between the two adjacent frames. Use of an integral image advantageously allows these sums to be calculated quickly and efficiently. This technique for determining the IFD advantageously captures local movement (such as a person running across a portion of the frame) as well as global changes (such as a fade-to-black cut). In an another implementation this is accomplished by calculating a difference in luminosity for each pixel across two adjacent frames, and then determining the IFD based on an average difference across all of the pixels comprising the frame.

While the above techniques compare an average luminosity for a pixel subset (or for individual pixels), in other embodiments a statistical metric other than average is used, such as median or mode. More generally, the techniques disclosed herein can be understood as establishing what is referred to herein as a "baseline pixel luminosity" associated with each of two adjacent frames. Given this, the IFD can be understood as corresponding to the difference between the two baselines, regardless of how such baselines are specifically calculated in a given implementation. In one embodiment an baseline pixel luminosity is calculated for each frame comprising the content item and IFD values are determined for each pair of adjacent frames. In other embodiments baseline pixel luminosities are calculated only for a portion of the frames comprising the content item and IFD values are determined only for adjacent frames for which baseline pixel luminosities have been calculated. For example, in some cases a user may specify, for instance via user interface sub-module 161, that only a smaller portion of a larger content item is to be subjected to a duration manipulation technique. Pixel luminosity is used as the basis of the determined IFD values since it can be calculated quickly and because differences in luminosity can be perceived by the human eye relatively easily. Pixel luminosity thus can serve as a reasonably accurate proxy for how a scene appears to a user viewing the content item.

IFD data calculated using the techniques disclosed herein tends not to be very smooth. Therefore in certain embodiments IFD smoothing sub-module 163 is configured to smoothen the IFD values using a Gaussian kernel $\sigma_i$. See reference numeral 2150 in FIG. 2A. Any of a variety of suitable kernel smoothing techniques can be used in this regard. In general, using smoother IFD data for the constraint minimization techniques that are used to identify preferred cut frame positions results in fewer visible and/or audible artifacts in the resulting manipulated content item. However, it will be appreciated that using such smoothing techniques is optional, and in alternative embodiments the raw IFD values are subjected to further processing without performing any such statistical manipulations.

Still referring to the example embodiment illustrated in FIGS. 2A through 2D, cut frame selection sub-module 164 is configured to determine a number of frames N to be cut from the multimedia content item based on duration reduction factor P. See reference numeral 2160 in FIG. 2A. For a received multimedia content item having M total frames configured for playback at a constant frame rate (for example as can be expressed in a number of frames per second), reducing the duration of the content item by a factor P can be understood as resulting in the removal of N frames, where $N=M\times(1-P)$. Thus the frames to be cut from the content item can be enumerated from the 1st to the Nth frame, each cut frame having a corresponding frame position $x_1, x_2, x_3, \ldots, x_N$. Thus the goal of the subsequent processing can be understood as establishing a set of preferred positions $\{x_1, x_2, x_3, \ldots, x_N\}$ wherein removing the frames at such positions leaves few, if any, visible or audible artifacts in the content item. In some cases a small number of frames $N_p$ are removed from predetermined positions in the content item, such as at the very beginning of the content item or at known transition points in the content item. In such embodiments the number of frames to be positioned using the constraint minimization techniques disclosed herein can be reduced by the quantity $N_p$.

Once the number of frames N to be cut from the multimedia content item is established, cut frame selection sub-module 164 can define an initial set of cut frame positions $\{x_1, x_2, x_3, \ldots, x_N\}$ based on identifying those frames with the highest and lowest IFD values, and further based on maintaining the minimum gap duration G. See reference numeral 2170 in FIG. 2A. For example, in one embodiment this is accomplished using a greedy algorithm that selects frames with the largest IFD values, in addition to the frames wherein IFD<$IFD_{min}$. In another embodiment the algorithm selects frames with the smallest IFD values, in addition to the frames wherein IFD>$IFD_{max}$. Other frame selection techniques can be used in other embodiments. For example, in embodiments wherein multiple cut frame position optimizations are performed, cut frame selection sub-module 164 can define the initial set of cut frame positions $\{x_1, x_2, x_3, \ldots, x_N\}$ based on the results of a prior optimization. See reference numeral 2175 in FIG. 2A. In any case, frame selections are made in a way that maintains the specified minimum gap duration G between two cut frames $x_i$ and $x_{i+1}$.

Once the initial set of cut frame positions is established, cut frame selection sub-module 164 is further configured to use a numerical optimization technique to optimize the cut frame positions. See reference numeral 2210 in FIG. 2B. A variety of numerical optimization techniques can be used in this regard, examples of which include the steepest descent technique, the Nelder-Mead simplex method, the Broyden-Fletcher-Goldfarb-Shanno (BFGS) algorithm, or a conjugate gradient technique. As used herein, the process of "optimizing" the cut frame positions refers to identifying particular cut frame positions where a viewer is less likely to perceive audible and/or visible artifacts as a result of removing a frame. The initially selected cut frame positions can then be adjusted, if appropriate, based on such optimization. This can be approached as a constraint optimization problem that responds to both IFD constraints and minimum gap duration constrains, as disclosed herein. For example, in one implementation an optimized set of cut frame positions $\{x_1, x_2, x_3, \ldots, x_N\}$ correspond to minimization of the quantity $$-\lambda \sum_{i=1}^{N} IFD'(x_i)^2 - \sum_{i=1}^{N} \{\ln[t(x_i) - t(x_{i-1}) - G] + \ln[t(x_{i+1}) - t(x_i) - G]\}, \quad (1)$$

where $x_0$ corresponds to the position of the first frame of the multimedia content item, and $x_{N+1}$ corresponds to the last frame of the content item.

Equation (1) consists of two sums. The first sum serves to emphasize removal of frames having extreme IFD values. To this end, the function $IFD'(x_i)$ represents a modified computation of the IFD at position $x_i$ where a smooth continuous correcting curve is applied for values IFD<$IFD_{min}$. This causes IFD values less than $IFD_{min}$ to receive a high function value instead of a low function value. IFD values greater than $IFD_{max}$ also receive a high function value as well. The $-\lambda$ value causes such values to be preferred when the value of Equation (1) is minimized. The value of the parameter λ determines the relative weight of the IFD-based sum as compared to the second sum, which serves to deemphasize removal of frames within the minimum gap duration G of another cut frame. That is, the second sum can be understood as a barrier function that enforces minimum gap duration G.

Minimizing the quantity of Equation (1) will result in an optimized set of cut frame positions $\{x_1, x_2, x_3, \ldots, x_N\}$, wherein removing frames at such positions will produce a content item having a duration that is reduced by a factor P, wherein any video artifacts created by removing the frames are relatively subtle or are not apparent to a typical viewer. Once such cut frame positions have been identified, cut frame selection sub-module 164 can be configured to determine whether to further refine the cut frame positions by performing another smoothing iteration on the IFD values. See reference numeral 2212 in FIG. 2B. If another smoothing iteration is to be performed, Gaussian kernel $\sigma_i$ can be reduced by a factor k, wherein k<1. See reference numeral 2214 in FIG. 2B. This causes the IFD values to be smoothened further, and when an subsequent optimization of the cut frame positions is performed, the previously optimized cut frame positions can be used as seed points. See reference numeral 2175 in FIG. 2A.

If no further smoothing of the IFD values is to be performed, frame removal sub-module 165 can be configured to remove frames from the content item at the identified cut frame positions. To facilitate sequential analysis of the N cut frames, frame removal sub-module 165 compares the quantity N to a cut frame counting parameter N' which is initially set such that N'=0. See reference numeral 2220 in FIG. 2B. Cut frame counting parameter N' is then incremented before subsequent processing. See reference numeral 2230 in FIG. 3B.

The N'th cut frame can be processed in a variety of ways. For example, in one implementation frame removal sub-module 165 cross-blends q frames that are adjacent to the N'th cut frame, wherein the cross-blending removes a time duration D corresponding to the duration of a single frame. See reference numeral 2232 in FIG. 2B. In one embodiment the quantity of cross-blended frames q is between 2 and 10 (inclusive), in another embodiment the quantity of cross-blended frames q is between 2 and 6 (inclusive), and in yet another embodiment the quantity of cross-blended frames q is between 3 and 4 (inclusive). In another implementation frame removal sub-module 165 removes the N'th cut frame without applying any cross-blending techniques. See reference numeral 2234 in FIG. 2B. A combination of different approaches for removing the N'th cut frame can be used as well. For example, in one such hybrid implementation frames having IFD>$IFD_{max}$ are cut without cross-blending, while other cut frames are cross-blended. Another time reduction techniques that can be used instead of, or in addition to, cross-blending and cutting is motion compensated blending, which works well to conceal removal of a single frame. Once the N'th cut frame is removed, it is determined whether N'=N. See reference numeral 2240 in FIG. 2B. If not, the cut frame counting parameter N' is incremented and the next cut frame is processed as described herein.

On the other hand, if all of the cut frames have been processed, the cut frame counting parameter N' is reset for subsequent audio processing, such that N'=1 once again. See reference numeral 2250 in FIG. 2B. Audio manipulation sub-module 166 can then be used to synchronize the original audio data with the modified (for example, shortened) video data. Because the removed video frames are not equidistant from each other and may be clustered in certain regions of the content item, simply cutting and crossfading the audio component across the entire content item may result in substantial discrepancies between the audio and video components of the content item. Rather, audio manipulation sub-module 166 is configured to cut and crossfade the audio in N localized regions surrounding the N positions where video frames were removed or cross-blended, or where the duration of the video component of the multimedia content item was otherwise manipulated.

In general, most viewers will not notice if audio is received shortly before (for example, up to about 30 milliseconds before), or shortly after (for example, up to about 60 milliseconds after), a corresponding video frame. These example time intervals correspond to one or two video frames based on the frame rates that are often used in contemporary digital video applications. The sum of these intervals therefore can be used to define a "removal opportunity window" of duration w that corresponds to a region around a point where a video frame was cut, and therefore where audio can be cut and crossfaded without introducing audible artifacts. For example, in one embodiment audio of duration D is removed from within a removal opportunity window of duration w, wherein D is the duration of the cut video frame, and w is a duration corresponding to the range of frames $(x_{i-1}, x_{i+2})$. While w is described in this example embodiment as corresponding to a total duration of three frame lengths D, one before the position of the ith cut frame and two after $(x_{i-1}, x_{i+2})$, it will be appreciated that other durations w can be used for the removal opportunity window in other embodiments. In one specific implementation, the duration w is about 90 milliseconds, and the frame length D is about 30 milliseconds. In other implementations w=3D generally, and the removal opportunity window asymmetrically surrounds the point where a video frame was removed such that most of the window occurs after the point where the video frame was removed.

Cutting more than about 20 milliseconds of audio data from a single position can cause audible artifacts to be introduced into the resulting modified content item. The duration of a single video frame will often exceed 20 milliseconds in many implementations. As a result, in certain embodiments K segments of audio data (K>1), each having duration k≤20 ms, are extracted from the removal opportunity window. Since the total duration of audio data which should be extracted is D (the duration of one video frame), the total number of segments of audio data which should be removed is K=D÷k. Thus, for example, for a video frame length D=30 ms and a segment duration k=10 ms, a total of K=D÷k=30 ms÷10 ms=3 segments of audio data should be removed from the removal opportunity window. In some cases the segment duration k is manipulated slightly such that an integral number of segments corresponds to the frame length D. Thus audio manipulation sub-module 166 can be configured to determine a quantity of audio data segments K which should be extracted from the N'th removal opportunity window. See reference numeral 2310 in FIG. 2C.

In general, the N'th removal opportunity window can be understood as comprising an essentially unlimited quantity of segments of duration k, each of which commences at a slightly different point. Audio manipulation sub-module 166 is configured to analyze a large quantity of these segments and identify the K segments having the lowest sound energy. See reference numeral 2320 in FIG. 2C. These K lowest energy segments can be identified, for example, by their starting point and duration. To facilitate sequential analysis of the K segments, audio manipulation sub-module 166 compares the quantity K to a segment counting parameter K' which is initially set such that K'=1. See reference numeral 2330 in FIG. 2C. A fundamental frequency $F_0$ and sample period $T_0$ are determined for the K'th segment. See reference numeral 2340 in FIG. 2C. In such embodiments audio manipulation sub-module 166 determines a quantity of samples L which are to be extracted from the K'th segment based on the integer multiple of the fundamental sample period $T_0$ that is closest to the segment duration k. See reference numeral 2350 in FIG. 2C. Thus L=k÷$T_0$, with L be rounded to the nearest integer. To avoid introducing discontinuities in the resulting audio signal, L samples are optionally crossfaded at the cut position using a correlation-based mixture of linear and constant power crossfade. See reference numeral 2360 in FIG. 2C.

Once the L samples are extracted from the K'th segment, the segment counting parameter K' is incremented. See reference numeral 2410 in FIG. 2D. It is then determined whether all K segments to be extracted from the N'th removal opportunity window have been processed, or stated alternatively, whether K'>K. See reference numeral 2420 in FIG. 2D. If not, the next K'th segment is processed as described herein. If all K segments to be extracted from the N'th removal opportunity window have been processed, that is, if K'>K, the cut frame counting parameter N' is incremented. See reference numeral 2430 in FIG. 2D. It is then determined whether the audio duration has been adjusted in all N removal opportunity windows, or stated alternatively, whether N'>N. See reference numeral 2440 in FIG. 2D. If not, the next N'th removal opportunity window is processed as described herein.

If audio data has been extracted from all N removal opportunity windows, that is, if N'>N, user interface sub-module 161 can be configured to generate a notification that the duration manipulation process is complete. See reference numeral 2450 in FIG. 2D. In some cases duration reduction module 160 can be configured to store the modified multimedia content item in networked media store 300. See reference numeral 2460 in FIG. 2D. In embodiments wherein the multimedia content item was originally obtained from another source, such as a storage resource that is local to computer system 100 (for example, a hard disc drive or a portable storage device), or from a different type of networked storage resource (for example, an email server or a peer-to-peer network), the modified multimedia content item can alternatively be provided to such other source. In other embodiments the modified multimedia content item can additionally be rendered immediately after the duration modification operation, such as by leveraging services provided by multimedia rendering module 170. In some embodiments, such as where a duration reduction operation is performed, rendering the shortened content item includes rendering supplemental content having a duration that corresponds to the reduced duration of the original content item. Thus, for example, an advertisement can be rendered in the time made available by shortening the original content item.

As described herein, in alternative embodiments a duration increase module is provided in addition to, or instead of, duration reduction module 160. In one such alternative embodiment an IFD calculation sub-module and an IFD smoothing sub-module can be used to process IFD data as described herein with respect to duration manipulation method 2000. An inserted frame selection sub-module can determine a number of inserted frame positions based on IFD extrema and a minimum gap duration, and thus can operate in substantially the same manner as cut frame selection module 164. In one implementation, frames are not inserted in high action sequences, and thus inserted frame selection sub-module determines inserted frame positions based only in IFD minima and disregards IFD maxima. A numerical optimization technique can be used to optimize the inserted frame positions. A frame insertion sub-module can be configured to insert duplicate frames at the positions identified by inserted frame selection sub-module. In some implementations a duplicative frame is inserted, while in other implementations a cross-blended frame is inserted. Once an appropriate number of frames are inserted, an audio manipulation sub-module can cut and crossfade the corresponding audio signal around the inserted frame positions as appropriate. Thus the techniques disclosed herein can be used to both increase and decrease the duration of a multimedia content item.

Figure 3A:
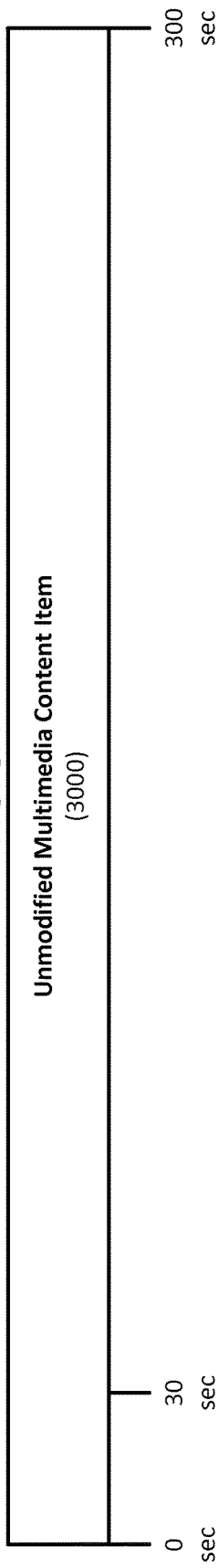
FIG. 3A is a timeline schematically illustrating an example multimedia content item having an initial duration of five minutes.
Figure 3B:
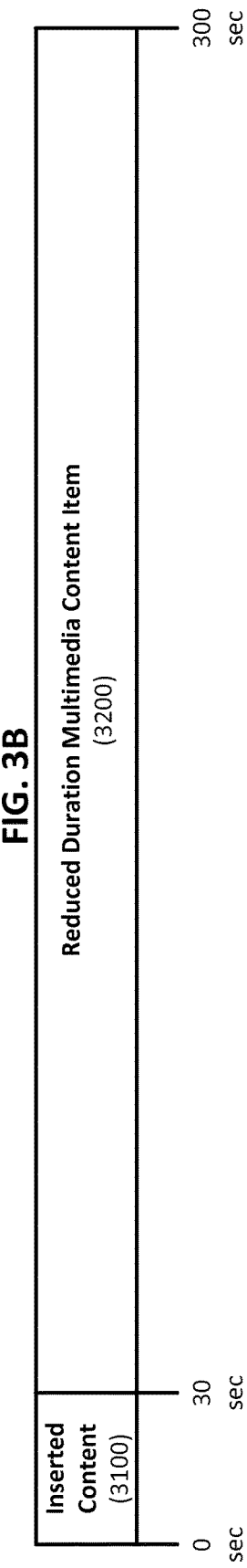
FIG. 3B is a timeline schematically illustrating the example multimedia content item of FIG. 3A after applying one of the duration manipulation techniques disclosed herein, wherein both the original content item and a thirty-second commercial announcement are played in the same five minute timeslot.

Using the techniques disclosed herein, duration reductions of up to 10% have been observed to be unnoticeable to most content consumers, while even higher reductions have been observed to be barely or only occasionally noticeable. For example, in certain embodiments duration reductions of up to 11%, 12%, 14%, 15% and 20% have been performed. The duration reduction techniques disclosed herein can be used to accommodate supplemental content which is to be rendered along with an original multimedia content item. For example, FIG. 3A is a timeline schematically illustrating an example unmodified multimedia content item 3000 having an initial duration of 300 seconds (five minutes). And FIG. 3B is a timeline schematically illustrating the example multimedia content item of FIG. 3A after applying one of the duration manipulation techniques disclosed herein. Such techniques result in a reduced duration multimedia content item 3200 having a modified duration of 270 seconds (four-and-one-half minutes). This reduction accommodates 30 seconds of inserted content 3100, such as a commercial announcement that precedes the rendering of reduced duration multimedia content item 3200. While FIG. 3B illustrates the inserted content as being rendered before reduced duration multimedia content item 3200, in other implementations it may alternatively be rendered after, or at an intermediate point of, reduced duration multimedia content item 3200. Thus in certain applications the techniques disclosed herein can be used by, for example, broadcasters and program managers to "micro-schedule" content and to increase advertising revenue available in a broadcast schedule.

CONCLUSION

Numerous configurations and variations will be apparent in light of this disclosure. For instance, one example embodiment provides a method for manipulating a duration of a multimedia content item, wherein the method comprises receiving a multimedia content item that comprises a plurality of video frames. The method further comprises calculating a plurality of IFD values associated with the multimedia content item. Each of the IFD values represents a difference between a baseline pixel luminosity associated with two adjacent video frames that comprise the multimedia content item. The method further comprises selecting an initial set of frame positions at least partially based on the plurality of IFD values and a minimum time gap G separating the frame positions. The method further comprises adjusting the frame positions using a numerical optimization technique. The method further comprises modifying a duration of the content item by manipulating one or more video frames at the adjusted frame positions. In some cases IFD values are calculated for each pair of adjacent video frames comprising the multimedia content item. In some cases the method further comprises smoothing the IFD values before selecting the initial set of frame positions. In some cases modifying the duration of the content item further comprises reducing the duration of the content item by removing a video frame associated with one of the adjusted frame positions. In some cases modifying the duration of the content item further comprises increasing the duration of the content item by inserting a video frame at one of the adjusted frame positions. In some cases the method further comprises (a) receiving a qualitative quality control input from a user; and (b) setting the minimum time gap G based on the qualitative quality control input. In some cases (a) the multimedia content item further comprises an audio track configured to be played synchronously with the video frames; and (b) the method further comprises modifying a duration of the audio track by cutting and crossfading the audio track within a window surrounding each of the adjusted frame positions. In some cases each of the IFD values represents a difference between an average pixel luminosity associated with pixels comprising two adjacent video frames that comprise the multimedia content item. In some cases each of the IFD values is calculated by (a) determining a first luminosity of a first pixel comprising a first video frame; (b) determining a second luminosity of a second pixel comprising a second video frame that is adjacent to the first video frame, wherein the first and second pixels correspond to a common position in the first and second video frames; (c) determining a difference between the first and second luminosities; (d) repeating (a), (b), and (c) for a plurality of the pixels comprising the first and second video frames, thereby producing a plurality of luminosity differences; and (e) averaging the plurality of luminosity differences. In some cases each of the IFD values is calculated by (a) generating a luminosity differential image defined by a difference between luminosities derived from first and second video frames; (b) determining a plurality of average luminosity differential values for a corresponding plurality of pixel subsets comprising the first video frame and a corresponding plurality of pixel subsets comprising the second video frame; and (c) determining a maximum from the plurality of average luminosity differential values.

Another example embodiment of the present invention provides a system for manipulating a duration of a multimedia content item, wherein the system comprises an IFD calculation module configured to calculate a plurality of IFD values associated with a corresponding plurality of video frames that comprise a multimedia content item. Each of the IFD values represents a difference between a baseline pixel luminosity associated with two adjacent video frames that comprise the multimedia content item. The system further comprises a frame selection module configured to identify a set of frame positions corresponding to IFD values that are less than a threshold value $IFD_{min}$. The system further comprises a duration manipulation module configured to modify a duration of the multimedia content item by manipulating one or more video frames at each of the frame positions. In some cases the frame selection module is configured to identify a set of frame positions corresponding to IFD values that are less than the threshold value $IFD_{min}$ or that are greater than a threshold value $IFD_{max}$. In some cases the frame selection module is configured to define the frame positions in consideration of a minimum time gap G separating the frame positions. In some cases the duration manipulation module is configured to reduce the duration of the multimedia content item by removing a video frame from at least one of the frame positions. In some cases the duration manipulation module is configured to reduce the duration of the multimedia content item by cross-blending a plurality of video frames adjacent to one of the frame positions. In some cases the system further comprises a user interface module configured to (a) receive a qualitative quality control input from a user, and (b) set the threshold value $IFD_{min}$ based on the qualitative quality control input.

Another example embodiment of the present invention provides a computer readable medium encoded with instructions that, when executed by one or more processors, cause a process for manipulating a duration of a multimedia content item to be carried out. The process comprises receiving a multimedia content item that includes a plurality of video frames and an audio track configured to be played synchronously with the video frames. The process further comprises calculating a plurality of IFD values associated with the multimedia content item. Each of the IFD values represents a difference between a baseline pixel luminosity associated with two adjacent video frames that comprise the multimedia content item. The process further comprises selecting an initial subset of cut frames at least partially based on the plurality of IFD values and a minimum time gap G separating the cut frames. Each of the cut frames is associated with a cut frame positions. The process further comprises adjusting the cut frame positions using a numerical optimization technique. The process further comprises removing a video frame associated with at least one of the adjusted cut frame positions. The process further comprises cutting and crossfading the audio track within a window surrounding each of the adjusted cut frame positions. Cutting the audio track causes a duration of the audio track to be reduced. In some cases the numerical optimization technique adjusts the cut frame positions by minimizing a quantity defined by Equation (1), wherein $\lambda$ is a weighting parameter; N is a quantity of cut frames in the initial subset of cut frames; $x_i$ represents an ith frame; $IFD'(x_i)$ represents a modified computation of the IFD corresponding to the $x_i$th frame wherein a smooth continuous correcting curve is applied for IFD values less than a threshold value $IFD_{min}$; and $t(x_i)$ corresponds to a time associated with the $x_i$th frame. In some cases the minimum time gap G is between about 0.25 seconds and about 0.50 seconds. In some cases cutting and crossfading the audio track further comprises (a) determining a quantity of audio data segments to be extracted from the window; (b) identifying an audio data segment existing within the window; (c) determining a fundamental frequency and a corresponding sample period of the identified audio data segment; and (d) crossfading a plurality of samples at the adjusted cut frame position corresponding to the window, wherein said crossfading is performed using a correlation-based mixture of linear and constant power crossfade.

The foregoing detailed description has been presented for illustration. It is not intended to be exhaustive or to limit the disclosure to the precise form described. Many modifications and variations are possible in light of this disclosure. Therefore it is intended that the scope of this application be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method for manipulating a duration of a multimedia content item, the method comprising:

receiving a multimedia content item that comprises a plurality of video frames;

calculating a plurality of inter frame distance (IFD) values associated with the multimedia content item, wherein each of the IFD values represents a difference between a baseline pixel luminosity associated with two adjacent video frames that comprise the multimedia content item;

smoothing the IFD values;

after smoothing the IFD values, selecting an initial set of frame positions at least partially based on the plurality of IFD values and a minimum time gap G separating the frame positions;

adjusting the frame positions using a numerical optimization technique; and modifying a duration of the content item by manipulating one or more video frames at the adjusted frame positions.

2. The method of claim 1, wherein IFD values are calculated for each pair of adjacent video frames comprising the multimedia content item.

3. The method of claim 1, wherein modifying the duration of the content item further comprises reducing the duration of the content item by removing a video frame associated with one of the adjusted frame positions.

4. The method of claim 1, wherein modifying the duration of the content item further comprises increasing the duration of the content item by inserting a video frame at one of the adjusted frame positions.

5. The method of claim 1, further comprising:
receiving a qualitative quality control input from a user; and
setting the minimum time gap G based on the qualitative quality control input.

6. The method of claim 1, wherein:
the multimedia content item further comprises an audio track configured to be played synchronously with the video frames; and
the method further comprises modifying a duration of the audio track by cutting and crossfading the audio track within a window surrounding each of the adjusted frame positions.

7. The method of claim 1, wherein each of the IFD values represents a difference between an average pixel luminosity associated with pixels comprising two adjacent video frames that comprise the multimedia content item.

8. The method of claim 1, wherein each of the IFD values is calculated by:
(a) determining a first luminosity of a first pixel comprising a first video frame;
(b) determining a second luminosity of a second pixel comprising a second video frame that is adjacent to the first video frame, wherein the first and second pixels correspond to a common position in the first and second video frames;
(c) determining a difference between the first and second luminosities;
(d) repeating (a), (b), and (c) for a plurality of the pixels comprising the first and second video frames, thereby producing a plurality of luminosity differences; and
(e) averaging the plurality of luminosity differences.

9. The method of claim 1, wherein each of the IFD values is calculated by:
(a) generating a luminosity differential image defined by a difference between luminosities derived from first and second video frames;
(b) determining a plurality of average luminosity differential values for a corresponding plurality of pixel subsets comprising the first video frame and a corresponding plurality of pixel subsets comprising the second video frame; and
(c) determining a maximum from the plurality of average luminosity differential values.

10. A system for manipulating a duration of a multimedia content item, the system comprising:
an inter frame distance (IFD) calculation module configured to calculate a plurality of IFD values associated with a corresponding plurality of video frames that comprise a multimedia content item, wherein each of the IFD values represents a difference between a baseline pixel luminosity associated with two adjacent video frames that comprise the multimedia content item;
a frame selection module configured to identify a set of frame positions corresponding to IFD values that are less than a threshold value $IFD_{min}$; and
a duration manipulation module configured to modify a duration of the multimedia content item by manipulating one or more video frames at each of the frame positions,
wherein each of the IFD values is calculated by (a) generating a luminosity differential image defined by a difference between luminosities derived from first and second video frames, (b) determining a plurality of average luminosity differential values for a corresponding plurality of pixel subsets comprising the first video frame and a corresponding plurality of pixel subsets comprising the second video frame, and (c) determining a maximum from the plurality of average luminosity differential values.

11. The system of claim 10, wherein the frame selection module is configured to identify a set of frame positions, each of which corresponds to an IFD value that is either less than the threshold value $IFD_{min}$ or greater than a threshold value $IFD_{max}$.

12. The system of claim 10, wherein the frame selection module is configured to define the frame positions in consideration of a minimum time gap G separating the frame positions.

13. The system of claim 10, wherein the duration manipulation module is configured to reduce the duration of the multimedia content item by removing a video frame from at least one of the frame positions.

14. The system of claim 10, wherein the duration manipulation module is configured to reduce the duration of the multimedia content item by cross-blending a plurality of video frames adjacent to one of the frame positions.

15. The system of claim 10, further comprising a user interface module configured to (a) receive a qualitative quality control input from a user, and (b) set the threshold value $IFD_{min}$ based on the qualitative quality control input.

16. A non-transitory computer readable medium encoded with instructions that, when executed by one or more processors, cause a process for reducing a duration of a multimedia content item to be carried out, the process comprising:
receiving a multimedia content item that includes a plurality of video frames and an audio track configured to be played synchronously with the video frames;
calculating a plurality of inter frame distance (IFD) values associated with the multimedia content item, wherein each of the IFD values represents a difference between a baseline pixel luminosity associated with two adjacent video frames that comprise the multimedia content item;

smoothing the IFD values;

after smoothing the IFD values, selecting an initial subset of cut frames at least partially based on the plurality of IFD values and a minimum time gap G separating the cut frames, wherein each of the cut frames is associated with a cut frame position;

adjusting the cut frame positions using a numerical optimization technique;

removing a video frame associated with at least one of the adjusted cut frame positions; and cutting and crossfading the audio track within a window surrounding each of the adjusted cut frame positions, wherein said cutting causes a duration of the audio track to be reduced.

17. The non-transitory computer readable medium of claim 16, wherein the numerical optimization technique adjusts the cut frame positions by minimizing a quantity $$-\lambda \sum_{i=1}^{N} IFD'(x_i)^2 - \sum_{i=1}^{N} \{\ln(t(x_i) - t(x_{i-1}) - G] + \ln[t(x_{i+1}) - t(x_i) - G]\},$$

wherein:

$\lambda$ is a weighting parameter;

N is a quantity of cut frames in the initial subset of cut frames;

$x_i$ represents an ith frame;

$IFD'(x_i)$ represents a modified computation of the IFD corresponding to the $x_i$th frame wherein a smooth continuous correcting curve is applied for IFD values less than a threshold value $IFD_{min}$; and $t(x_i)$ corresponds to a time associated with the $x_i$th frame.

18. The non-transitory computer readable medium of claim 16, wherein the minimum time gap G is between about 0.25 seconds and about 0.50 seconds.

19. The non-transitory computer readable medium of claim 16, wherein cutting and crossfading the audio track further comprises:

determining a quantity of audio data segments to be extracted from the window;

identifying an audio data segment existing within the window;

determining a fundamental frequency and a corresponding sample period of the identified audio data segment; and crossfading a plurality of samples at the adjusted cut frame position corresponding to the window, wherein said crossfading is performed using a correlation-based mixture of linear and constant power crossfade.

* * * * *